(12) United States Patent (10) Patent No.: US 12,028,230 B1
Aghadavoodi Jolfaei et al. (45) Date of Patent: Jul. 2, 2024

(54) CONTEXT ANALYSIS ENGINE FOR INFORMATION TECHNOLOGY INCIDENTS

(71) Applicant: SAP SE, Walldorf (DE)

(72) Inventors: Masoud Aghadavoodi Jolfaei, Wiesloch (DE); Frank Brunswig, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/223,223

(22) Filed: Jul. 18, 2023

(51) Int. Cl.
*G06F 15/173* (2006.01)
*H04L 43/0823* (2022.01)
*H04L 67/10* (2022.01)

(52) U.S. Cl.
CPC .......... *H04L 43/0823* (2013.01); *H04L 67/10* (2013.01)

(58) Field of Classification Search
CPC ............................. H04L 43/0823; H04L 67/10
See application file for complete search history.

(56) References Cited

U.S. PATENT DOCUMENTS

| | | | |
|---|---|---|---|
| 9,189,355 B1* | 11/2015 | Moturu | G06F 11/3495 |
| 2022/0174097 A1* | 6/2022 | Biswas | H04L 43/0817 |
| 2022/0321668 A1* | 10/2022 | Gunasekaran | H04W 12/03 |
| 2023/0004478 A1* | 1/2023 | Susman | G06F 11/3636 |

* cited by examiner

*Primary Examiner* — Joseph R Maniwang
(74) *Attorney, Agent, or Firm* — SCHWEGMAN LUNDBERG & WOESSNER, P.A.

(57) ABSTRACT

A computer-implemented method may comprise detecting an occurrence of an information technology (IT) incident between a cloud service and a software application based on observability data of the cloud service, where the observability data indicates a current state of the cloud service, the cloud service runs within a first network, and the software application runs within a second network different from the first network. The computer-implemented method may further comprise obtaining context information for the IT incident from the second network in response to the detecting of the occurrence of the IT incident, where the context information indicating circumstances in which the IT incident occurred, and then determining a countermeasure for the IT incident based on the context information. The computer-implemented method may additionally comprise performing an action based on the countermeasure.

20 Claims, 6 Drawing Sheets

CONTEXT ANALYSIS ENGINE FOR INFORMATION TECHNOLOGY INCIDENTS

BACKGROUND

An information technology (IT) incident or issue refers to an unexpected or unplanned event that disrupts an IT service or reduces the quality of the IT service. Examples of such incidents include, but are not limited to, bugs, defects, application performance degradation issues, availability issues, connectivity issues, and communication issues. Certain classes or groups of incidents, such as unexpected communication issues between a client application and a cloud service, require several interactions with a user of the client application and the involvement of various product and development support teams to acquire context information about the issue to proceed with the issue handling and identification of a proper solution. Furthermore, if issues are not detected and handled as soon as possible, they may become worse.

The analysis of network issues, especially for stateful communication protocols (e.g., database connections or remote procedure call communications), takes a long time and can involve different infrastructure teams due to involvement of different network components, such as egress components, network address translators, ingress components, and load balancers. Network interruption issues can arise for various reasons and the analysis of such issues may include the involvement of network components. In server components, there is often no information about the reason for connection interruptions, unless the connection was closed by the server (e.g., due to connection or session timeout). The reason for the connection interruption is usually available on the client side at the client application and based on protocol-specific connection error codes and error texts, or the connection interruption issue may be caused by the intermediary network components (e.g., exceeding the number of sockets).

Usually, customers create a customer case (e.g., an incident ticket) if an incident occurs, and the customer case is forwarded to the responsible support team. For the analysis and identification of a solution, intensive interaction with the customer and manual efforts for enablement and activation of different communication analysis tools on the client side and on the server side with the involvement of infrastructure or development support teams is required. As a result, the handling of IT incidents may take a long time, leaving the incident unresolved, and negatively affecting the ability of the cloud service to perform its functions.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems of using a context analysis engine to handle information technology incidents are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to use a context analysis engine to handle information technology incidents. In some example embodiments, a computer system may detect an occurrence of an information technology (IT) incident between a cloud service and a software application based on observability data of the cloud service, where the observability data indicates a current state of the cloud service, the cloud service is running within a first network, and the software application is running within a second network different from the first network. Next, the computer system may obtain context information for the IT incident from the second network in response to the detecting of the occurrence of the IT incident, where the context information indicates circumstances in which the IT incident occurred. The computer system may then determine a countermeasure for the IT incident based on the context information, and perform an action based on the countermeasure.

By obtaining context information for the IT incident from the second network on which the software application runs and determining a countermeasure for the IT incident based on the context information in response to the detecting of the occurrence of the IT incident, the computer system reduces the number of interactions and communications between users and support teams in handling IT incidents, thereby reducing the consumption of network bandwidth involved in such interactions and communications. Additionally, by proactively determining context information for the IT incident and determining the appropriate countermeasure for the IT incident in response to the detection of the occurrence of the IT incident, the computer system improves the handling of the IT incident, as the underlying technical problem quickly and effectively, thereby preventing further damage to the functioning of system resources. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
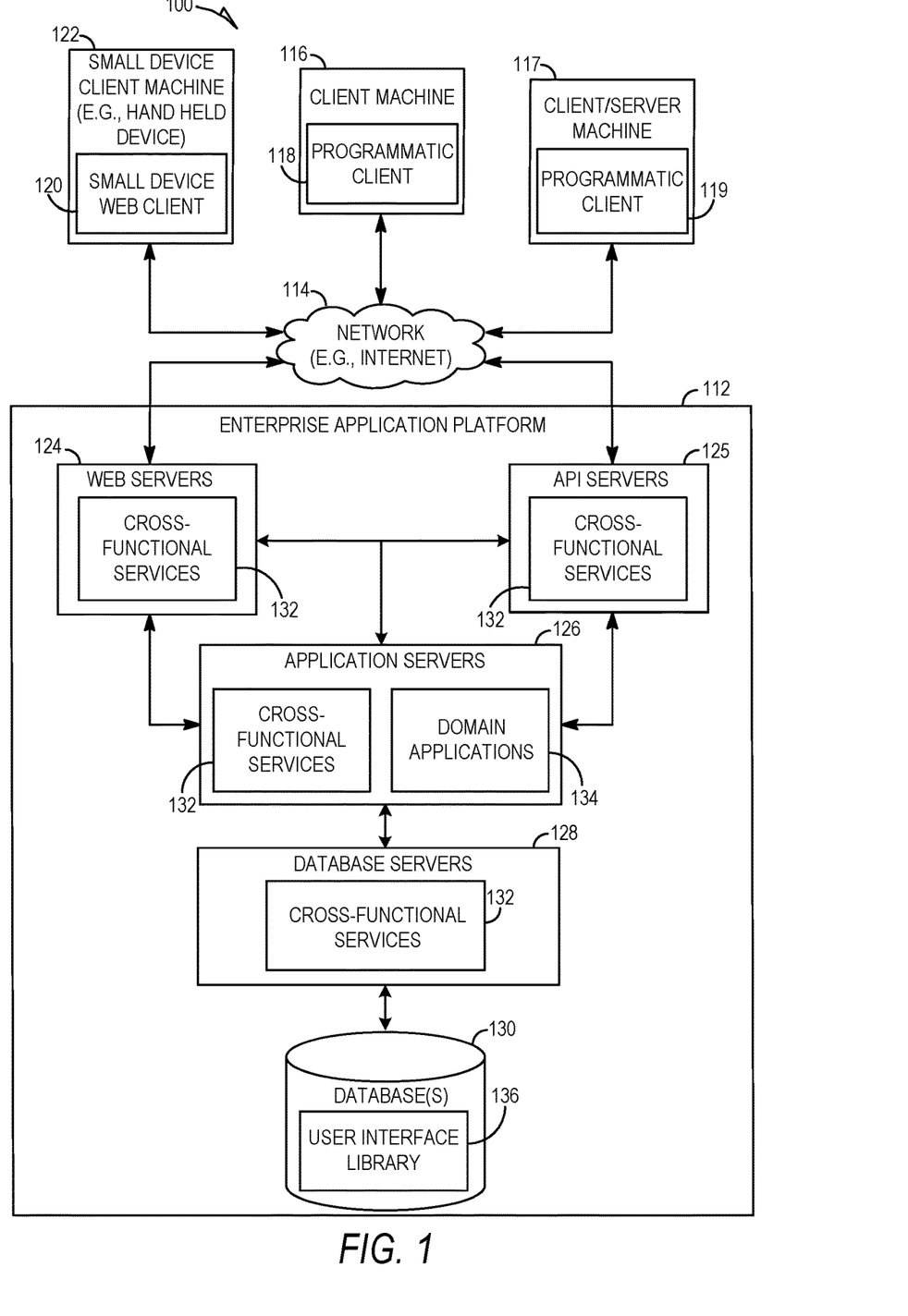
FIG. 1 is an example network diagram illustrating a system.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
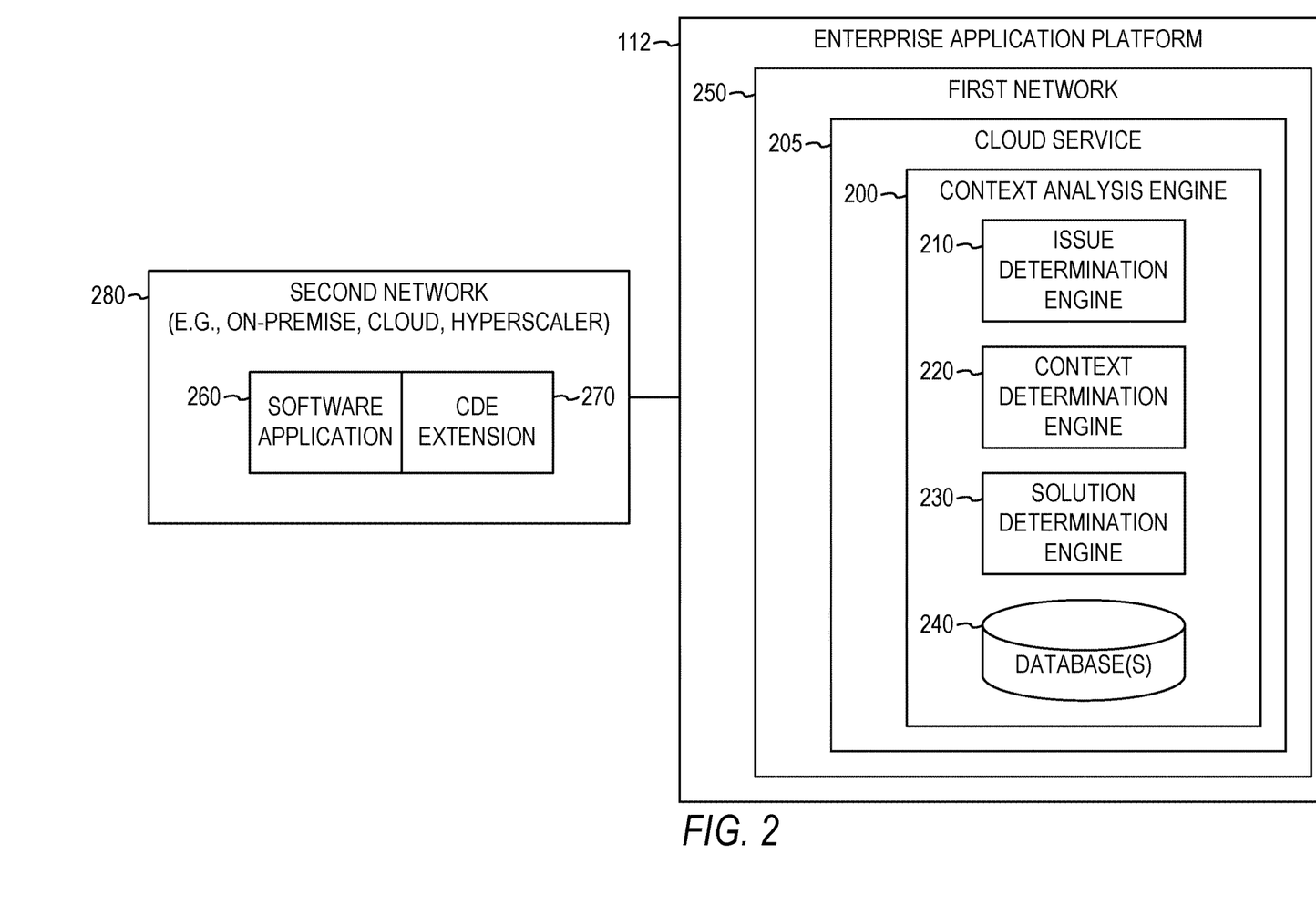
FIG. 2 is a block diagram illustrating an example context analysis engine.

FIG. 2 is a block diagram illustrating an example context analysis engine 200. The components shown in FIG. 2 may be configured to communicate with each other via one or more network connections, such as via the network 114 in FIG. 1. In some example embodiments, the context analysis engine 200 may comprise an issue determination engine 210, a context determination engine 220, a solution determination engine 230, and one or more databases 240. The context analysis engine 200 may be implemented as part of a cloud service 205. The cloud service 205 may be running on a cloud platform, such as on the enterprise application platform 112 of FIG. 1. However, the context analysis engine 200 may be implemented in other ways as well.

The cloud service 205 may comprise software or infrastructure that resources that are hosted by a cloud service provider and made available for use by users through the Internet. For example, the cloud service 205 may serve requests that are sent from a software application 260. In some example embodiments, the cloud service 205 and the software application 260 may reside and run within different networks from each other. For example, the cloud service 205 may reside and run within a first network 250, such as a network of the enterprise application platform 112, while the software application 260 may reside and run within a second network 280 that is different from the first network 250, such as an on-premise network, another cloud-based network, or a hyperscaler network. The first network 250 and the second network 280 may each comprise their own edge devices that handle egress traffic out of and ingress traffic into the respective networks. The edge devices may comprise one or more of routers, firewalls, network address translation components, or load balancers.

In some example embodiments, the cloud service 205 may comprise a database-as-a-service (DBaaS) that allows users to access and use a cloud database system without purchasing and setting up their own hardware, installing their own database software, or managing the database themselves. The cloud service 205 may store and retrieve data as requested by users or other applications. The cloud service 205 may also be configured to perform other functions as well, such as reporting, online analytical processing, data mining, complex event processing, business performance management, predictive analytics, and prescriptive analytics.

The software application 260 may comprise any application that is configured to communicate with the cloud service 205. In some example embodiments, the software application 260 may comprise a client application that sends requests to the cloud service 205. For example, the software application 260 may establish a connection with the cloud service 205, and then send requests for data (e.g., database queries) to a DBaaS instance of the cloud service 205. Other types of requests and software applications 260 are also within the scope of the present disclosure.

In some example embodiments, the issue determination engine 210 may be configured to detect an occurrence of an information technology (IT) incident between the cloud service 205 and the software application 260 based on observability data of the cloud service 205. Examples of the IT incident may include, but are not limited to, bugs, defects, application performance degradation issues, availability issues, connectivity issues, and communication issues. For example, the IT incident may comprise an interruption of a network connection between the cloud service 205 and the software application 260. However, other types of IT incidents are also within the scope of the present disclosure.

The observability data may indicate a current state of the cloud service 205. For example, the observability data may comprise log data indicating one or more discrete events that have occurred within the cloud service 205, such as a record of errors and operations of the cloud service 205. The observability data may additionally or alternatively comprise trace data that tracks a processing of a request by the cloud service 205. The trace data may provide information about the execution of a program of the cloud service 205. The observability data may additionally or alternatively comprise or one or more metrics of the cloud service 205, such as at least one of a metric of received requests (e.g., a number of requests received by the cloud service 205 per minute), a latency metric (e.g., a measure of delay by the cloud service 205 in responding to a request), or an error rate metric (e.g., a measure of how often a request received by the cloud service 205 results in an error). Other types of observability data are also within the scope of the present disclosure.

In some example embodiments, the detecting of the occurrence of the IT incident comprises performing a pattern matching algorithm on the observability data. The issue determination engine 210 may scan the observability data to find a match for a regular expression (e.g., a sequence of characters). The regular expression may correspond to a particular type of IT incident. In response to determining that there is a match for the regular expression in the observability data, the issue determination engine 210 may determine that the particular type of IT incident has occurred between the cloud service 205 and the software application 260. For example, the issue determination engine 210 may check the observability data to determine whether any information about an unexpected connection interruption has been reported, such as by scanning for the regular expression "connection failed <text>."

The occurrence of the IT incident may be detected in other ways as well. For example, the issue determination engine 210 may use an artificial intelligence model or approach to detect the occurrence of the IT incident. For example, the detecting of the occurrence of the IT incident may comprise inputting the observability data into a machine learning model that is configured to output an indication of whether or not an IT incident has occurred (e.g., a probability that an IT incident has occurred) based on the inputted observability data. The machine learning model may be trained to output a positive detection of an occurrence of an IT incident based on inputted observability data using a supervised learning approach in which instances of observability data that are each labeled with a corresponding positive or negative label are used as training data. Other techniques for detecting the occurrence of the IT incident, such as the use of one or more pattern matching models, are also within the scope of the present disclosure.

The context determination engine 220 may be configured to obtain context information for the IT incident from the second network 280 in response to the detecting of the occurrence of the IT incident. The context information may indicate circumstances in which the IT incident occurred. In some example embodiments, the context information comprises at least one of an Internet Protocol (IP) address of the software application 260, a port identifier of the software application 260, an error code corresponding to the IT incident, error text corresponding to the IT incident, or a timestamp of the IT incident. The context information may additionally or alternatively comprise log data indicating one or more discrete events that have occurred within the software application 260. Furthermore, the context information may additionally or alternatively comprise trace data that tracks a processing of a request by the software application 260. Other types of context information are also within the scope of the present disclosure.

In some example embodiments, the context determination engine 220 may obtain the context information by sending a request to the second network 280. The context determination engine 220 may send the request to a context determination engine (CDE) extension 270 of the software application 260. The CDE extension 270 may comprise a software extension that extends the capabilities of the software application 260. For example, the CDE extension 270 may be configured to handle the request from the context determination engine 220 on behalf of the software application 260. The request may be configured to cause the CDE extension 270 to collect the context information and send the collected context information to the context determination engine 220. The request may be configured to cause the CDE extension 270 to perform a tracing of the software application 260, and the collected context information may comprise output of the tracing of the software application 260, which may be sent from the CDE extension 270 to the context determination engine 220. In some example embodiments, in addition to or as an alternative to the CDE extension 270 collecting the context information and sending it to the context determination engine 220 on-demand in response to receiving a request from the context determination engine 220, the CDE extension 270 may be configured to proactively collect the context information and send it to the context determination engine 220 without the context determination engine 220 sending a request for the context information. For example, the CDE extension 270 may periodically collect the context information and send it to the context determination engine 220 as part of a routine procedure. The context information may be stored in the database(s) 240 for subsequent use by the context analysis engine 200.

The context determination engine 220 may be configured to receive the collected context information from the CDE extension 270, and then send the collected context information to the solution determination engine 230 for use in determining the countermeasure for the IT incident. The solution determination engine 230 may be configured to determine a countermeasure for the IT incident based on the context information. The solution determination engine 230 may use a rules-based approach to determine the countermeasure for the IT incident. For example, the determining of the countermeasure for the IT incident may comprise applying one or more rules to the context information, such as, if the context information comprises one or more specific attributes or satisfies one or more conditions, then the solution determination engine 230 may determine that a particular countermeasure should be applied. In one example, the solution determination engine 230 may determine that a connection timeout has occurred between the software application 260 and the cloud service 205 more than a threshold amount of times within a specified time period, and, based on that determination, determine that a specific countermeasure should be performed, such as increasing an idle connection timeout parameter that controls a maximum length of time that a network connection can stay active when no traffic is sent through the connection before a timeout occurs. Other types of rules and countermeasures are also within the scope of the present disclosure.

In addition to or as an alternative to using one or more rules to determine the countermeasure for the IT incident, the solution determination engine 230 may use an artificial intelligence model or approach to determine the countermeasure for the IT incident. For example, the determining of the countermeasure for the IT incident may comprise inputting the context information into a machine learning model that is configured to output the countermeasure based on the inputted context information. The machine learning model may be trained to output a countermeasure based on inputted context information using a supervised learning approach in which instances of context information that are each labeled with a corresponding countermeasure are used as training data.

In some example embodiments, the countermeasure comprises modifying a configuration parameter of the software application 260. The configuration parameter may comprise a user-definable setting that controls the functioning or behavior of the software application 260, the cloud service 205, or some other computing resource. For example, the countermeasure may comprise increasing an idle connection timeout parameter that controls a maximum length of time that a network connection can stay active when no traffic is sent through the connection before a timeout occurs. However, other types of countermeasures are also within the scope of the present disclosure.

The solution determination engine 230 may be configured to perform an action based on the determined countermeasure. In some example embodiments, the action may comprise causing the countermeasure to be displayed on a computing device. For example, the solution determination engine 230 may cause details of the countermeasure to be displayed on a computing device of a user of the software application 260, a user of the cloud service 205, or one or more support team members for the software application 260 or the cloud service 205. The details of the countermeasure may comprise one or more steps or actions to be performed in order to address the IT incident.

In some example embodiments, the action may comprise triggering an execution of the countermeasure by a resource of the first network 250 or by a resource of the second network 280. For example, the solution determination engine 230 may send an instruction to a component of the first network 250 (e.g., to the cloud service 205) or to a component of the second network 280 (e.g., to the software application 260) to perform the action. Along with the countermeasure, an identification of the IT incident and the context information for the IT incident may be caused to be displayed on the computing device as well.

The context analysis engine 200 may be used in data federation and replication scenarios. The context analysis engine 200 may be implemented within a federated database system in which multiple autonomous database systems are mapped into a single federated database. The constituent databases are interconnected via a computer network and may be geographically decentralized. The federated database system comprises a virtual database, which is a composite of all constituent databases in the federated database system. The federated database system may provide a uniform user interface, enabling users and clients to store and retrieve data from multiple noncontiguous databases with a single query, even when the constituent databases are heterogeneous. The federated database system may also be configured to perform data replication, in which data is copied from one location to another location.

Figure 3:
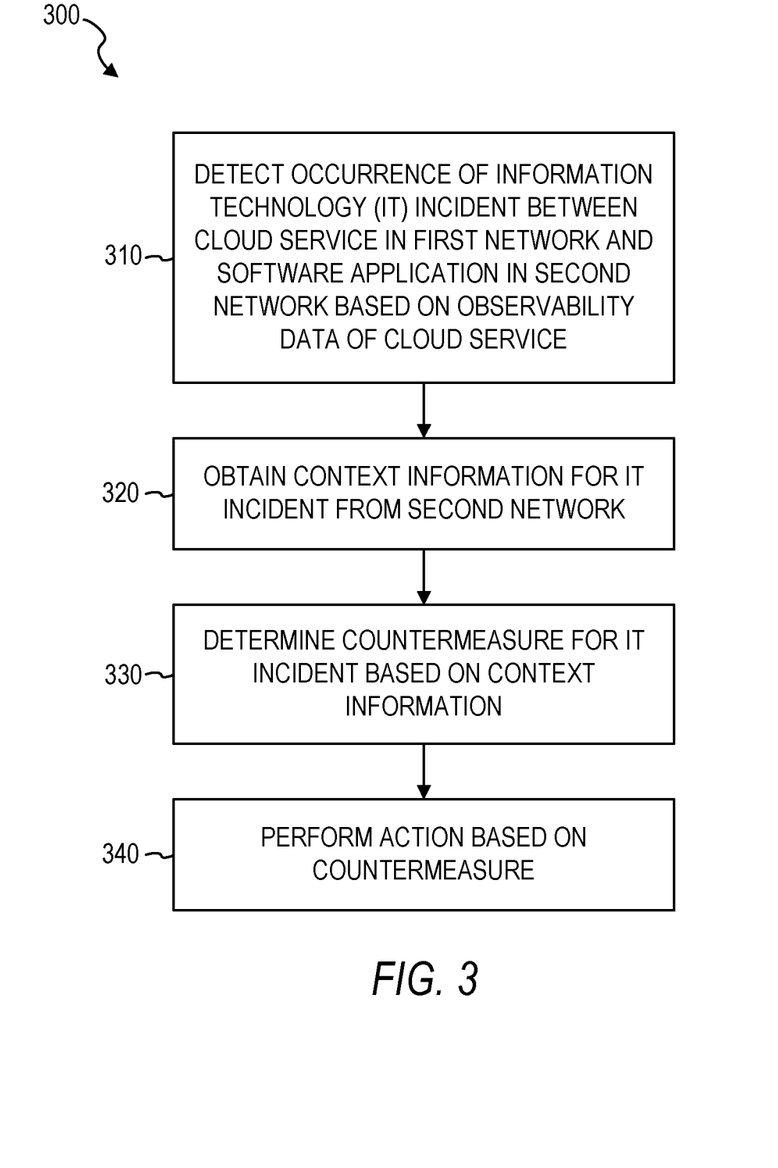
FIG. 3 is a flowchart illustrating an example method of using a context analysis engine to handle information technology incidents.

FIG. 3 is a flowchart illustrating an example method 300 of using the context analysis engine 200 to handle information technology incidents. The method 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 300 are performed by the context analysis engine 200 of FIG. 2 or any combination of one or more of its components (e.g., by the issue determination engine 210, the context determination engine 220, the solution determination engine 230).

At operation 310, the context analysis engine 200 may detect an occurrence of an information technology (IT) incident between a cloud service 205 and a software application 260 based on observability data of the cloud service 205. The cloud service 205 may be running within a first network 250, while the software application 260 may be running within a second network 280 different from the first network 250. In some example embodiments, the observability data may indicate a current state of the cloud service 205. The observability data may comprise log data indicating one or more discrete events that have occurred within the cloud service 205, trace data that tracks a processing of a request by the cloud service 205, or one or more metrics of the cloud service 205, such as at least one of a metric of received requests, a latency metric, or an error rate metric. In some example embodiments, the detecting of the occurrence of the IT incident comprises performing a pattern matching algorithm on the observability data. However, the occurrence of the IT incident may be detected in other ways as well. The IT incident may comprise an interruption of a network connection between the cloud service 205 and the software application 260. However, other types of IT incidents are also within the scope of the present disclosure.

Next, the context analysis engine 200 may, at operation 320, obtain context information for the IT incident from the second network 280 in response to the detecting of the occurrence of the IT incident. The context information may indicate circumstances in which the IT incident occurred. In some example embodiments, the context information comprises at least one of an Internet Protocol (IP) address of the software application 260, a port identifier of the software application 260, an error code corresponding to the IT incident, error text corresponding to the IT incident, or a timestamp of the IT incident. The context information may additionally or alternatively comprise log data indicating one or more discrete events that have occurred within the software application 260. Furthermore, the context information may additionally or alternatively comprise trace data that tracks a processing of a request by the software application 260.

The context analysis engine 200 may then determine a countermeasure for the IT incident based on the context information, at operation 330. The context analysis engine 200 may use a rules-based approach to determine the countermeasure for the IT incident. For example, the determining of the countermeasure for the IT incident may comprise applying one or more rules to the context information. In addition to or as an alternative to using one or more rules to determine the countermeasure for the IT incident, the context analysis engine 200 may use an artificial intelligence model or approach to determine the countermeasure for the IT incident. For example, the determining of the countermeasure for the IT incident may comprise inputting the context information into a machine learning model that is configured to output the countermeasure based on the inputted context information. In some example embodiments, the countermeasure comprises modifying a configuration parameter of the software application 260. However, other types of countermeasures are also within the scope of the present disclosure.

At operation 340, the context analysis engine 200 may perform an action based on the countermeasure. In some example embodiments, the action may comprise causing the countermeasure to be displayed on a computing device. For example, the context analysis engine 200 may cause details of the countermeasure to be displayed on a computing device of a user of the software application 260, a user of the cloud service 205, or one or more support team members for the software application 260 or the cloud service 205. The details of the countermeasure may comprise one or more steps or actions to be performed in order to address the IT incident. In some example embodiments, the action may comprise triggering an execution of the countermeasure by the first network 250 or by the second network 280. For example, the context analysis engine 200 may send an instruction to a component of the first network 250 (e.g., to the cloud service 205) or to a component of the second network 280 (e.g., to the software application 260) to perform the action. Along with the countermeasure, an identification of the IT incident and the context information for the IT incident may be caused to be displayed on the computing device as well.

It is contemplated that any of the other features described within the present disclosure can be incorporated into the method 300.

Figure 4:
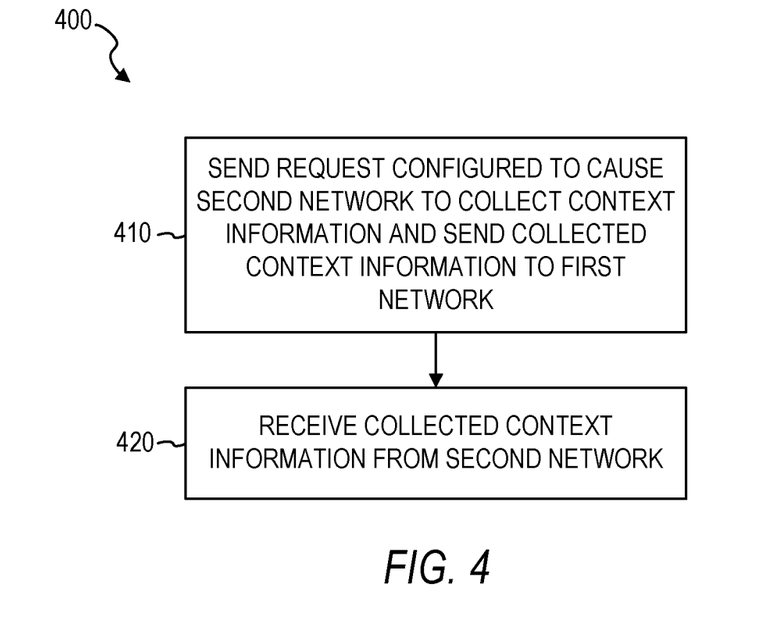
FIG. 4 is a flowchart illustrating an example method of obtaining context information for an IT incident from a software application.

FIG. 4 is a flowchart illustrating an example method 400 of obtaining context information for an IT incident from a software application. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the context analysis engine 200 of FIG. 2 or any combination of one or more of its components (e.g., by the context determination engine 220). The method 400 may comprise operations 410 and 420, which may be incorporated into the method 300 of FIG. 3, such as part of operation 320.

At operation 410, the context analysis engine 200 may send a request from the first network 250 to the second network 280. The request may be configured to cause the second network 280 to collect the context information and send the collected context information to the first network 250. The request may be configured to cause the second network 280 to perform a tracing of the software application 260, and the collected context information may comprise output of the tracing of the software application 260, which may be sent from the second network 280 to the first network 250.

Then, the context analysis engine 200 may receive the collected context information from the second network, at operation 420. The context determination engine 220 may receive the collected context information, and then send the collected context information to the solution determination engine 230 for use in determining the countermeasure for the IT incident, such as in operation 330 of the method 300 of FIG. 3. In some example embodiments, the context analysis engine 200 may receive the collected context information from a software extension of the software application 260, such as from the CDE extension 270. The software extension may be configured to collect the context information, such as by performing a tracing of the software application 260.

It is contemplated that any of the other features described within the present disclosure can be incorporated into the method 400.

Figure 5:
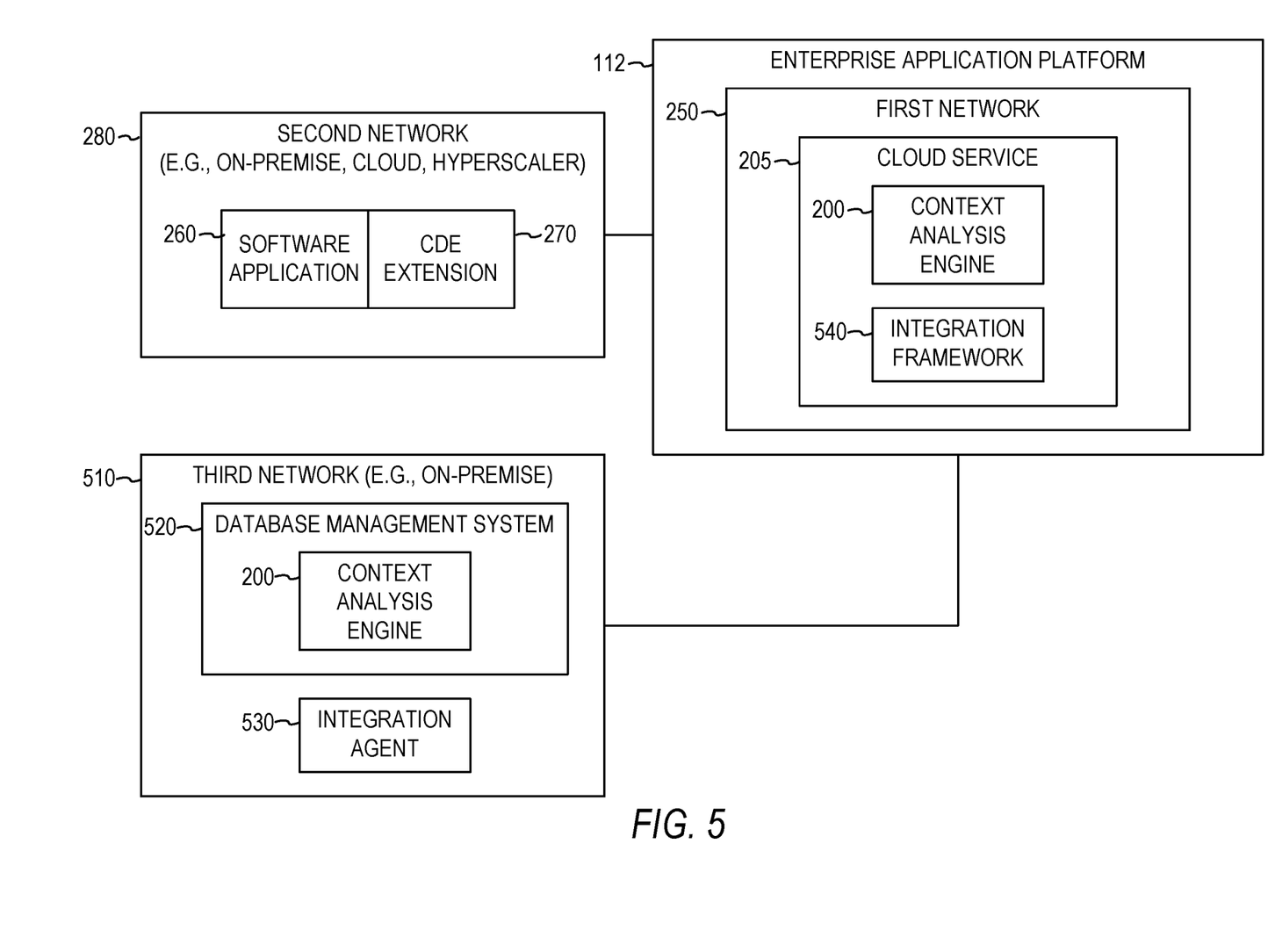
FIG. 5 is a block diagram illustrating the example context analysis engine being implemented in a data federation and replication scenario.

FIG. 5 is a block diagram illustrating the example context analysis engine being implemented in a data federation and replication scenario. The example embodiments shown in FIG. 5 comprises the same components as the example embodiment shown in FIG. 2. However, the example embodiment of FIG. 5 also comprises a third network 510 that is different from the first network 250 and the second network 280. The third network 510 may comprise an on-premises landscape (e.g., an intranet). In FIG. 5, the software application 260 may execute queries (e.g., SQL queries) on virtual tables maintained in the cloud service 205 within the first network 250. The virtual tables may refer, via a maintained connection, to a physical table residing in a database management system 520 within the third network 510. The third network 510 may comprise an integration agent 530 that is configured to communicate with an integration framework 540 implemented by the cloud service 205 to provide data integration and data access functions, such as by providing tools to access source data and provision, replicate, transfer, and transform that data in on-premise systems and in the cloud. In some example embodiments, an instance of the context analysis engine 200 resides in the third network 510, such as being installed within or otherwise implemented as part of the database management system 520. Here, in addition to being able to access data from and execute commands on the resources of the first network 250 and the resources of the second network 280, the context analysis engine 200 is also able to access data from and execute commands on the resources of the third network 510 as well. As a result, the context analysis engine 200 may access, collect, and analyze observability data and context information from the third network, and also execute commands, such as requests to collect data and requests to perform actions corresponding to countermeasures, on the third network 510.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: detecting an occurrence of an information technology (IT) incident between a cloud service and a software application based on observability data of the cloud service, the observability data indicating a current state of the cloud service, the cloud service running within a first network, the software application running within a second network different from the first network; obtaining context information for the IT incident from the second network in response to the detecting of the occurrence of the IT incident, the context information indicating circumstances in which the IT incident occurred; determining a countermeasure for the IT incident based on the context information; and performing an action based on the countermeasure.

Example 2 includes the computer-implemented method of example 1, wherein the observability data comprises log data indicating one or more discrete events that have occurred within the cloud service.

Example 3 includes the computer-implemented method of example 1 or example 2, wherein the observability data comprises trace data that tracks a processing of a request by the cloud service.

Example 4 includes the computer-implemented method of any one of examples 1 to 3, wherein the observability data comprises one or more metrics of the cloud service, the one or more metrics comprising at least one of a metric of received requests, a latency metric, or an error rate metric.

Example 5 includes the computer-implemented method of any one of examples 1 to 4, wherein the detecting of the occurrence of the IT incident comprises performing a pattern matching algorithm on the observability data.

Example 6 includes the computer-implemented method of any one of examples 1 to 5, wherein the IT incident comprises an interruption of a network connection between the cloud service and the software application.

Example 7 includes the computer-implemented method of any one of examples 1 to 6, wherein the obtaining of the context information for the IT incident comprises: sending a request from the first network to the second network, the request configured to cause the second network to collect the context information and send the collected context information to the first network; and receiving, by the first network, the collected context information from the second network.

Example 8 includes the computer-implemented method of any one of examples 1 to 7, wherein the request is configured to cause the second network to perform a tracing of the software application, the collected context information comprising output of the tracing of the software application.

Example 9 includes the computer-implemented method of any one of examples 1 to 8, wherein the context information comprises at least one of an Internet Protocol (IP) address of the software application, a port identifier of the software application, an error code corresponding to the IT incident, error text corresponding to the IT incident, or a timestamp of the IT incident.

Example 10 includes the computer-implemented method of any one of examples 1 to 9, wherein the context information comprises log data indicating one or more discrete events that have occurred within the software application.

Example 11 includes the computer-implemented method of any one of examples 1 to 10, wherein the context information comprises trace data that tracks a processing of a request by the software application.

Example 12 includes the computer-implemented method of any one of examples 1 to 11, wherein the determining of the countermeasure for the IT incident comprises applying one or more rules to the context information.

Example 13 includes the computer-implemented method of any one of examples 1 to 12, wherein the determining of the countermeasure for the IT incident comprises inputting the context information into a machine learning model.

Example 14 includes the computer-implemented method of any one of examples 1 to 13, wherein the countermeasure comprises modifying a configuration parameter of the software application.

Example 15 includes the computer-implemented method of any one of examples 1 to 14, wherein the action comprises causing the countermeasure to be displayed on a computing device.

Example 16 includes the computer-implemented method of any one of examples 1 to 15, wherein the action comprises triggering an execution of the countermeasure by the first network or by the second network.

Example 17 includes a system comprising: at least one processor; and a non-transitory computer-readable medium storing executable instructions that, when executed, cause the at least one processor to perform the method of any one of examples 1 to 16.

Example 18 includes a non-transitory machine-readable storage medium, tangibly embodying a set of instructions that, when executed by at least one processor, causes the at least one processor to perform the method of any one of examples 1 to 16.

Example 19 includes a machine-readable medium carrying a set of instructions that, when executed by at least one processor, causes the at least one processor to carry out the method of any one of examples 1 to 16.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
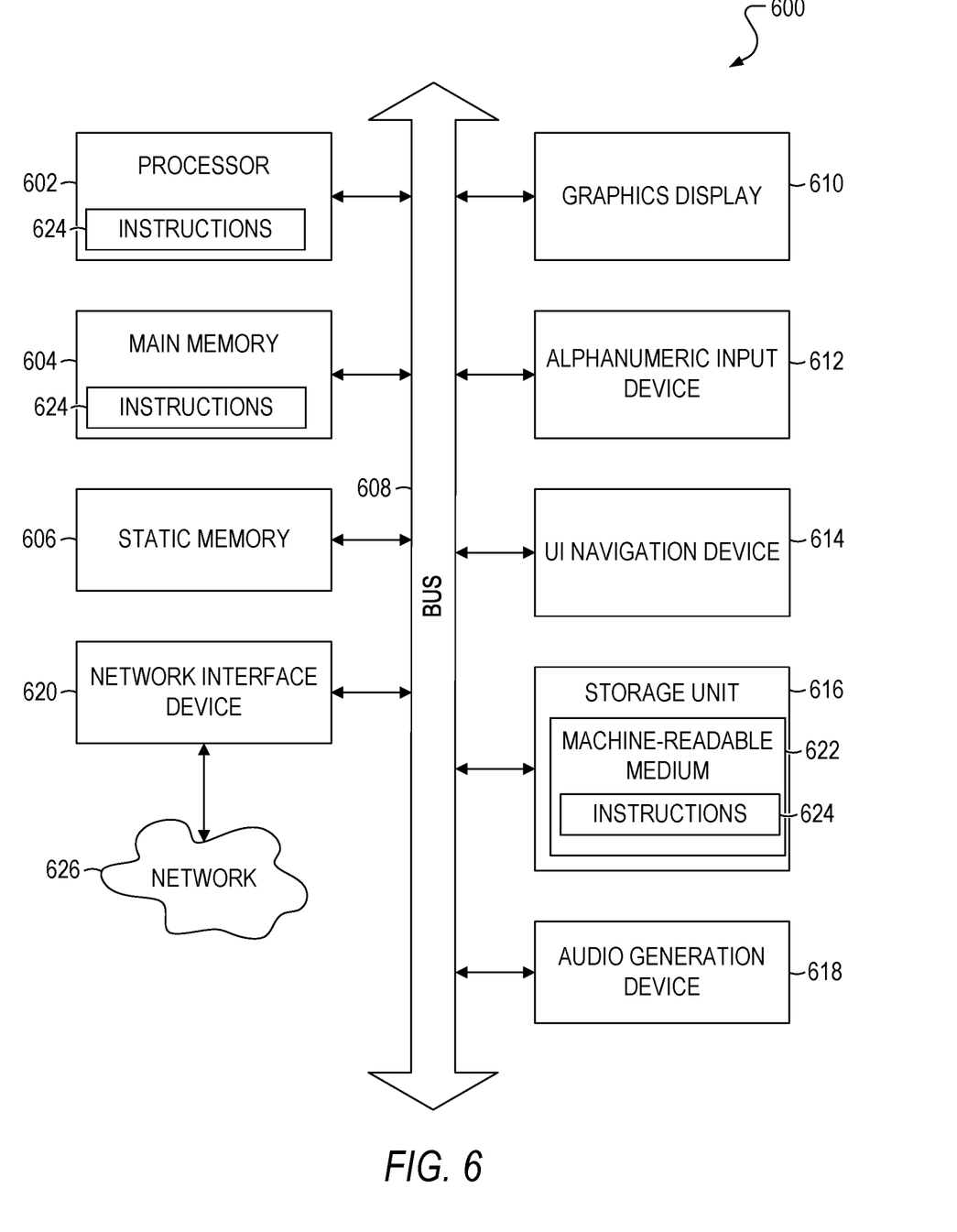
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
   detecting an occurrence of an information technology (IT) incident between a cloud service and a software application based on observability data of the cloud service, the observability data indicating a current state of the cloud service, the cloud service running within a first network, the software application running within a second network different from the first network;
   obtaining context information for the IT incident from the second network in response to the detecting of the occurrence of the IT incident, the context information indicating circumstances in which the IT incident occurred, the obtaining of the context information for the IT incident comprising:

sending a request from the first network to the second network, the request configured to cause the second network to collect the context information and send the collected context information to the first network, the request being further configured to cause the second network to perform a tracing of the software application, the collected context information comprising output of the tracing of the software application; and receiving, by the first network, the collected context information from the second network;

determining a countermeasure for the IT incident based on the context information; and performing an action based on the countermeasure.

2. The computer-implemented method of claim 1, wherein the observability data comprises log data indicating one or more discrete events that have occurred within the cloud service.

3. The computer-implemented method of claim 1, wherein the observability data comprises trace data that tracks a processing of a request by the cloud service.

4. The computer-implemented method of claim 1, wherein the observability data comprises one or more metrics of the cloud service, the one or more metrics comprising at least one of a metric of received requests, a latency metric, or an error rate metric.

5. The computer-implemented method of claim 1, wherein the detecting of the occurrence of the IT incident comprises performing a pattern matching algorithm on the observability data.

6. The computer-implemented method of claim 1, wherein the IT incident comprises an interruption of a network connection between the cloud service and the software application.

7. The computer-implemented method of claim 1, wherein the context information comprises at least one of an Internet Protocol (IP) address of the software application, a port identifier of the software application, an error code corresponding to the IT incident, error text corresponding to the IT incident, or a timestamp of the IT incident.

8. The computer-implemented method of claim 1, wherein the context information comprises log data indicating one or more discrete events that have occurred within the software application.

9. The computer-implemented method of claim 1, wherein the context information comprises trace data that tracks a processing of a request by the software application.

10. The computer-implemented method of claim 1, wherein the determining of the countermeasure for the IT incident comprises applying one or more rules to the context information.

11. The computer-implemented method of claim 1, wherein the determining of the countermeasure for the IT incident comprises inputting the context information into a machine learning model.

12. The computer-implemented method of claim 1, wherein the countermeasure comprises modifying a configuration parameter of the software application.

13. The computer-implemented method of claim 1, wherein the action comprises causing the countermeasure to be displayed on a computing device.

14. The computer-implemented method of claim 1, wherein the action comprises triggering an execution of the countermeasure by the first network or by the second network.

15. A system of comprising:
at least one hardware processor; and
a non-transitory computer-readable medium storing executable instructions that, when executed, cause the at least one hardware processor to perform computer operations comprising:

detecting an occurrence of an information technology (IT) incident between a cloud service and a software application based on observability data of the cloud service, the observability data indicating a current state of the cloud service, the cloud service running within a first network, the software application running within a second network different from the first network;

obtaining context information for the IT incident from the second network in response to the detecting of the occurrence of the IT incident, the context information indicating circumstances in which the IT incident occurred, the obtaining of the context information for the IT incident comprising:

sending a request from the first network to the second network, the request configured to cause the second network to collect the context information and send the collected context information to the first network, the request being further configured to cause the second network to perform a tracing of the software application, the collected context information comprising output of the tracing of the software application; and receiving, by the first network, the collected context information from the second network;

determining a countermeasure for the IT incident based on the context information; and performing an action based on the countermeasure.

16. The system of claim 15, wherein the observability data comprises log data indicating one or more discrete events that have occurred within the cloud service.

17. The system of claim 15, wherein the observability data comprises trace data that tracks a processing of a request by the cloud service.

18. A non-transitory machine-readable storage medium tangibly embodying a set of instructions that, when executed by at least one hardware processor, causes the at least one processor to perform computer operations comprising:

detecting an occurrence of an information technology (IT) incident between a cloud service and a software application based on observability data of the cloud service, the observability data indicating a current state of the cloud service, the cloud service running within a first network, the software application running within a second network different from the first network;

obtaining context information for the IT incident from the second network in response to the detecting of the occurrence of the IT incident, the context information indicating circumstances in which the IT incident occurred, the obtaining of the context information for the IT incident comprising:

sending a request from the first network to the second network, the request configured to cause the second network to collect the context information and send the collected context information to the first network, the request being further configured to cause the second network to perform a tracing of the software application, the collected context information comprising output of the tracing of the software application; and receiving, by the first network, the collected context information from the second network;

determining a countermeasure for the IT incident based on the context information; and performing an action based on the countermeasure.

19. The non-transitory machine-readable storage medium of claim 18, wherein the observability data comprises log data indicating one or more discrete events that have occurred within the cloud service.

20. The non-transitory machine-readable storage medium of claim 18, wherein the observability data comprises trace data that tracks a processing of a request by the cloud service.

* * * * *